(12) United States Patent
Oh et al.

(10) Patent No.: US 12,349,118 B2
(45) Date of Patent: Jul. 1, 2025

(54) METHOD AND APPARATUS FOR RESOURCE ALLOCATION IN WIRELESS COMMUNICATION SYSTEM

(71) Applicant: Electronics and Telecommunications Research Institute, Daejeon (KR)

(72) Inventors: Dae Sub Oh, Daejeon (KR); Satya Chan, Jeonju-si (KR); Sooyoung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 17/898,783

(22) Filed: Aug. 30, 2022

(65) Prior Publication Data

US 2023/0077650 A1   Mar. 16, 2023

(30) Foreign Application Priority Data

Aug. 30, 2021 (KR) .................. 10-2021-0115034
Aug. 30, 2022 (KR) .................. 10-2022-0109202

(51) Int. Cl.
*H04W 72/044* (2023.01)
*H04B 7/0426* (2017.01)
(Continued)

(52) U.S. Cl.
CPC ..... *H04W 72/046* (2013.01); *H04W 72/0473* (2013.01); *H04W 72/52* (2023.01); *H04W 72/542* (2023.01)

(58) Field of Classification Search
None
See application file for complete search history.

(56) References Cited

U.S. PATENT DOCUMENTS 8,675,545 B2   3/2014 Oh et al.
10,630,593 B2   4/2020 Paramasivam
(Continued)

FOREIGN PATENT DOCUMENTS

CN   110325929 B   5/2021
CN   113765553 A   12/2021
(Continued)

OTHER PUBLICATIONS

Unhee Park et al., "Interference-Limited Dynamic Resource Management for an Integrated Satellite/Terrestrial System", 2014, ETRI Journal, vol. 36, pp. 519-527 (Year: 2014).*
Lei Lei et al., "Beam Illumination Pattern Design in Satellite Networks: Learning and Optimization for Efficient Beam Hopping", 2020, IEEE Access, pp. 1-14 (Year: 2020).*
(Continued)

*Primary Examiner* — Jeffrey M Rutkowski
*Assistant Examiner* — Ning Li
(74) *Attorney, Agent, or Firm* — NSIP Law

(57) ABSTRACT

An operation method in a communication system may comprise: obtaining information on a per-beam required traffic amount; determining whether the per-beam required traffic amount can be serviced while satisfying a first condition according to a first model generated through pre-training in a first machine learning structure; in response to determining that the per-beam required traffic amount can be serviced while satisfying the first condition, calculating per-beam bandwidth allocation information based on the per-beam required traffic amount; calculating per-beam power allocation information based on the per-beam bandwidth allocation information; identifying whether an SNR condition included in the first condition is satisfied based on the per-beam power allocation information; and in response to identifying that the SNR condition is satisfied, outputting the per-beam bandwidth allocation information and the per-beam power allocation information.

15 Claims, 7 Drawing Sheets

(51) Int. Cl.
  *H04B 17/391*   (2015.01)
  *H04W 52/42*   (2009.01)
  *H04W 72/52*   (2023.01)
  *H04W 72/542*   (2023.01)

(56) References Cited

U.S. PATENT DOCUMENTS

| | | | |
|---|---|---|---|
| 11,055,615 | B2 | 7/2021 | Litichever et al. |
| 2012/0172049 | A1* | 7/2012 | Wu .................. H04W 72/0473 455/452.1 |
| 2018/0293076 | A1* | 10/2018 | Sadasivam ............. G06N 3/063 |
| 2020/0044725 | A1* | 2/2020 | Breynaert ............. H04L 5/0048 |
| 2020/0336989 | A1* | 10/2020 | Rong .................. H04W 52/246 |
| 2020/0396753 | A1* | 12/2020 | Jaldén ................. H04W 52/241 |
| 2021/0037089 | A1* | 2/2021 | Xiang .................. H04L 67/101 |
| 2021/0124617 | A1 | 4/2021 | Choi et al. |
| 2022/0039101 | A1* | 2/2022 | Wang ................ H04W 52/0206 |

FOREIGN PATENT DOCUMENTS

| | | |
|---|---|---|
| EP | 2 290 842 A2 | 3/2011 |
| KR | 10-2016-0108045 A | 9/2016 |

OTHER PUBLICATIONS

Park, Unhee, et al. "Interference-Limited Dynamic Resource Management for an Integrated Satellite/Terrestrial System." *ETRI Journal* vol. 36. Issue 4 (2014). pp. 519-527.

Lei, Lei, et al. "Beam illumination pattern design in satellite networks: Learning and optimization for efficient beam hopping." *IEEE Access* 8 (2020). pp. 1-14.

Jia, Min, et al. "Interbeam interference constrained resource allocation for shared spectrum multibeam satellite communication systems." *IEEE Internet of Things Journal* vol. 6. Issue 4 (2018). pp. 6052-6059.

Park, Unhee, et al. "Interference-Limited Dynamic Resource Management for an Integrated Satellite/Terrestrial System." ETRI Journal 36.4, Aug. 2014. (pp. 519-527).

* cited by examiner

METHOD AND APPARATUS FOR RESOURCE ALLOCATION IN WIRELESS COMMUNICATION SYSTEM

CROSS-REFERENCE TO RELATED APPLICATIONS

This application claims priority to Korean Patent Applications No. 10-2021-0115034 filed on Aug. 30, 2021, and No. 10-2022-0109202 filed on Aug. 30, 2022, in the Korean Intellectual Property Office (KIPO), the entire contents of which are hereby incorporated by reference.

BACKGROUND

1. Technical Field

The present disclosure relates to a resource allocation technique for a wireless communication system, and more particularly, to a technique for allocating resources such as per-beam bandwidth and power based on a machine learning algorithm in a wireless communication system using multiple beams.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

The NR communication network may provide communication services to terminals located in terrestrial sites. Recently, the demand for communication services for planes, drones, etc., which are located in the non-terrestrial places, or the demand for communication services through satellites is increasing. To this end, techniques for a non-terrestrial network (NTN) are being discussed.

Meanwhile, a frequency reuse technique may be applied to efficiently provide services to multiple users using limited radio resources in a wireless communication network. For example, when a plurality of beams or a plurality of cells use the same frequency band, the frequency reuse technique may be used to mitigate inter-beam interference or inter-cell interference. In particular, in a communication environment (e.g., NTN, or the like) in which resources such as frequency and power are very limited, a technique for efficiently allocating resources using the frequency reuse technique may be required.

Matters described as the prior arts are prepared to promote understanding of the background of the present disclosure, and may include matters that are not already known to those of ordinary skill in the technology domain to which exemplary embodiments of the present disclosure belong.

SUMMARY

Accordingly, exemplary embodiments of the present disclosure provide a method and an apparatus for resource allocation, which can improve the performance of allocating resources such as per-beam bandwidth and power based on a machine learning algorithm in a wireless communication system to which a frequency reuse technique is applied.

According to an exemplary embodiment of the present disclosure, an operation method of a first apparatus in a communication system may comprise: obtaining information on a per-beam required traffic amount; determining whether the per-beam required traffic amount can be serviced while satisfying a first condition including an available total bandwidth condition and an available total power condition according to a first model generated through pre-training in a first machine learning structure; in response to determining that the per-beam required traffic amount can be serviced while satisfying the first condition, calculating per-beam bandwidth allocation information based on the per-beam required traffic amount; calculating per-beam power allocation information based on the per-beam bandwidth allocation information; identifying whether a signal-to-noise ratio (SNR) condition included in the first condition is satisfied based on the per-beam power allocation information; and in response to identifying that the SNR condition is satisfied, outputting the per-beam bandwidth allocation information and the per-beam power allocation information.

The determining may comprise: generating first input data by converting the information on the per-beam required traffic amount into a vector; inputting the first input data to the first model; and identifying an output value of the first model.

The first machine learning structure may have a perceptron structure, the output value of the first model, which has a positive value, may mean that the per-beam required traffic amount can be serviced while satisfying the first condition, and the output value of the first model, which has a negative value, may mean that the per-beam required traffic amount cannot be serviced while satisfying the first condition.

The pre-training in the first machine learning structure may be performed based on the data obtained from a second model after the second model is generated through pre-training in a second machine learning structure for calculation of the per-beam bandwidth allocation information.

The calculating of the per-beam bandwidth allocation information may comprise: inputting first input data generated based on the information on the per-beam required traffic amount into a second model generated through pre-training in a second machine learning structure; and obtaining output data from the second model, wherein the output data includes the per-beam bandwidth allocation information.

The second machine learning structure may have a machine learning structure according to a linear regression learning scheme, and the pre-training in the second machine learning structure may be performed based on the data obtained from an exhaustive search scheme in a direction in which a value of a loss function calculated based on first bandwidth allocation information output based on information on a first required traffic amount is minimized.

The operation method may further comprise, after the determining, in response to determining that the per-beam required traffic amount cannot be serviced while satisfying the first condition, performing an affine projection operation for calculating a reduced required traffic amount reduced from the per-beam required traffic amount; and calculating the per-beam bandwidth allocation information based on second input data generated as a result of the affine projection operation and including information on the reduced required traffic amount.

The operation method may further comprise, after the identifying, in response to identifying that the SNR condition is not satisfied, adjusting a boundary value used in the affine projection operation; performing the affine projection operation based on the adjusted boundary value; and calculating the per-beam bandwidth allocation information based on third input data generated as a result of the affine projection operation performed based on the adjusted boundary value.

Furthermore, according to another exemplary embodiment of the present disclosure, a first apparatus in a communication system may comprise: a processor; a memory electronically communicating with the processor; and instructions stored in the memory, wherein when executed by the processor, the instructions cause the first apparatus to: obtain information on a per-beam required traffic amount; determine whether the per-beam required traffic amount can be serviced while satisfying a first condition including an available total bandwidth condition and an available total power condition according to a first model generated through pre-training in a first machine learning structure; in response to determining that the per-beam required traffic amount can be serviced while satisfying the first condition, calculate per-beam bandwidth allocation information based on the per-beam required traffic amount; calculate per-beam power allocation information based on the per-beam bandwidth allocation information; identify whether a signal-to-noise ratio (SNR) condition included in the first condition is satisfied based on the per-beam power allocation information; and in response to identifying that the SNR condition is satisfied, output the per-beam bandwidth allocation information and the per-beam power allocation information.

In the determining, the instructions may further cause the first apparatus to: generate first input data by converting the information on the per-beam required traffic amount into a vector; input the first input data to the first model; and identify an output value of the first model.

The first machine learning structure may have a perceptron structure, the output value of the first model, which has a positive value, may mean that the per-beam required traffic amount can be serviced while satisfying the first condition, the output value of the first model, which has a negative value, may mean that the per-beam required traffic amount cannot be serviced while satisfying the first condition, and the pre-training in the first machine learning structure may be performed based on the data obtained from a second model after the second model is generated through pre-training in a second machine learning structure for calculation of the per-beam bandwidth allocation information.

In the calculating of the per-beam bandwidth allocation information, the instructions may further cause the first apparatus to: input first input data generated based on the information on the per-beam required traffic amount into a second model generated through pre-training in a second machine learning structure; and obtain output data output from the second model, wherein the output data includes the per-beam bandwidth allocation information.

The second machine learning structure may have a machine learning structure according to a linear regression learning scheme, and the pre-training in the second machine learning structure may be performed based on the data obtained from an exhaustive search scheme in a direction in which a value of a loss function calculated based on first bandwidth allocation information output based on information on a first required traffic amount is minimized.

The instructions may further cause the first apparatus to, after the determining, in response to determining that the per-beam required traffic amount cannot be serviced while satisfying the first condition, perform an affine projection operation for calculating a reduced required traffic amount reduced from the per-beam required traffic amount; and calculate the per-beam bandwidth allocation information based on second input data generated as a result of the affine projection operation.

The instructions may further cause the first apparatus to, after the identifying, in response to identifying that the SNR condition is not satisfied, adjust a boundary value used in the affine projection operation; perform the affine projection operation based on the adjusted boundary value; and calculate the per-beam bandwidth allocation information based on third input data generated as a result of the affine projection operation performed based on the adjusted boundary value.

According to exemplary embodiments of a method and an apparatus for resource allocation in a wireless communication system, in the wireless communication system to which the frequency reuse technique is applied, a first communication node may allocate resources such as bandwidth and power based on machine learning. The first communication node may obtain information on per-beam (or per-cell) required traffic amount, and determine whether the required traffic amount can be serviced through resources such as a system bandwidth and a power available in the first communication node. When it is determined that the required traffic amount cannot be serviced, the traffic amount may be reduced, and a per-beam bandwidth and/or power for servicing the reduced traffic amount may be determined. Through such the process, an unnecessary amount of computation in the resource allocation process can be reduced, and service efficiency can be improved.

DETAILED DESCRIPTION

Figure 1:
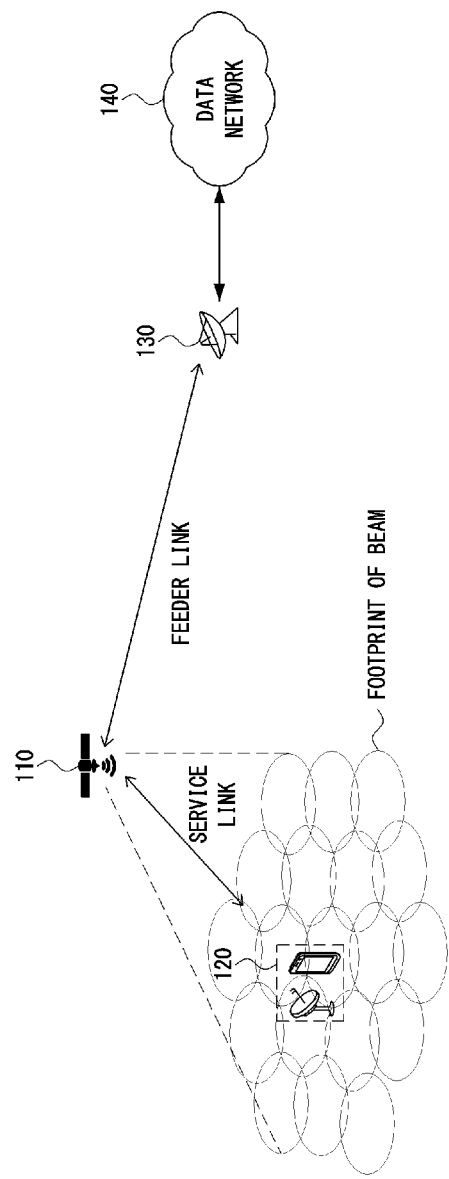
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), or the like. The 4G communication network and the 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial place. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
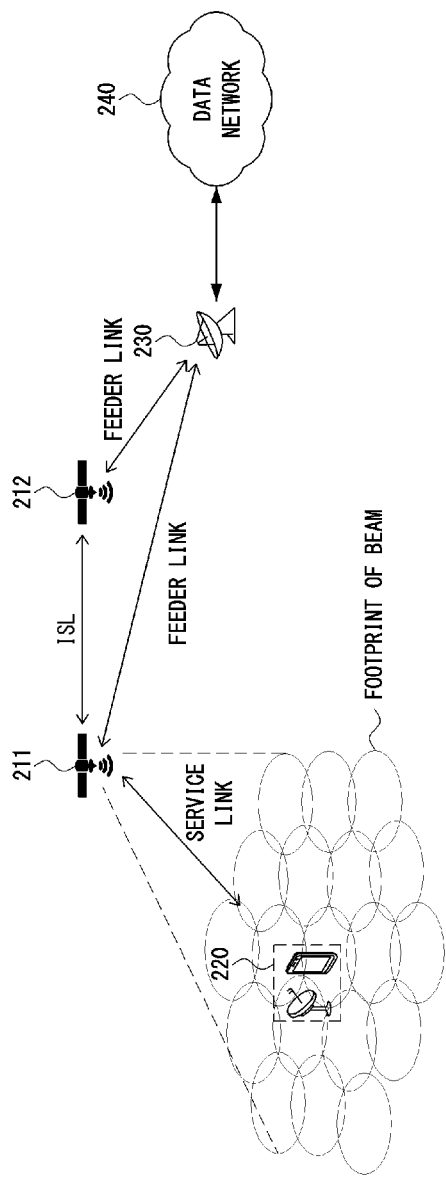
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

Figure 3:
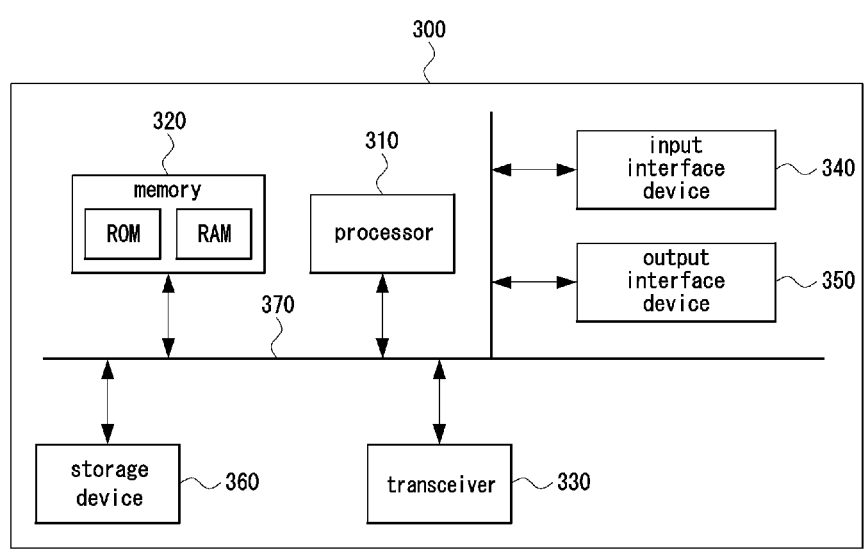
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other. However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present invention are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
|---|---|---|
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 60 0 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Hereinafter, resource allocation methods for a wireless communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 4:
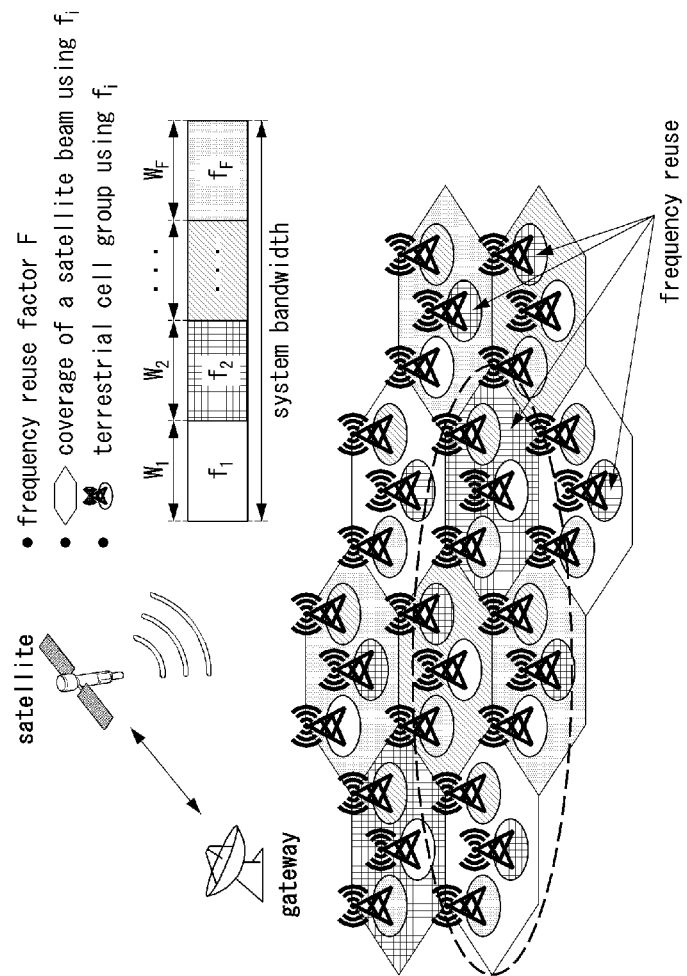
FIG. 4 is a conceptual diagram for describing an exemplary embodiment of a communication system to which a frequency reuse technique is applied.

FIG. 4 is a conceptual diagram for describing an exemplary embodiment of a communication system to which a frequency reuse technique is applied.

Referring to FIG. 4, a communication system may be configured to include an NTN and/or a terrestrial network. For example, the communication system may include an NTN configured to provide services to a predetermined coverage, including one or more satellites and one or more gateways. Here, the NTN may be configured identically or similarly to at least one of the first and second exemplary embodiments of the NTN described with reference to FIGS. 1 and 2. The one or more satellites and the one or more gateways included in the NTN may be the same as or similar to the satellites 110, 211 and 212 and the gateways 130 and 230 described with reference to FIGS. 1 and 2. The NTN may provide services to terrestrial communication nodes using multiple beams. Meanwhile, the communication system may include the terrestrial network configured to provide services to a predetermined coverage, including one or more terrestrial cells. Alternatively, the communication system may be an integrated satellite and terrestrial (IST) system configured to include the NTN and the terrestrial network.

In the communication system, a frequency reuse technique may be applied to efficiently provide services to multiple users using limited radio resources. For example, when a plurality of beams used in the NTN and/or a plurality of cells of the terrestrial network shown in FIG. 4 use the same frequency band, inter-beam interference and/or inter-cell interference may occur. As described above, the frequency reuse technique may be used to mitigate the interference due to the use of the same frequency band. In particular, in a communication environment (e.g., NTN, or the like) in which resources such as frequency and power are very limited, it may be advantageous to efficiently allocate resources when the frequency reuse technique is used. The resource allocation may be performed by a predetermined apparatus (hereinafter, referred to as a 'resource allocation apparatus') included in the communication system.

In an exemplary embodiment of the communication system, the frequency reuse technique may be applied in such a manner that the same frequency can be used in different beams or cells with a geographically sufficient separation distance. For example, an resource allocation apparatus for a satellite and/or terrestrial cell using a multi-beam may allocate frequency bands based on a frequency reuse factor F. For example, the resource allocation apparatus may configure a plurality of bandwidths $w_1, w_2, \ldots,$ and $w_F$ by dividing an available total frequency bandwidth based on the frequency reuse factor F. The bandwidths $w_1, w_2, \ldots,$ and $w_F$ may each have a center frequency $f_1, f_2, \ldots,$ and $f_F$. A satellite using a multi-beam may control coverages of a plurality of beams using bandwidths having the same center frequency to be geographically separated from each other based on the frequency reuse technique.

If it is not easy to provide a sufficient separation distance so that interference does not occur at all, the frequency reuse technique may allocate resources such as a minimum power and/or bandwidth to each beam and/or cell so as to easily overcome interference between beams and/or cells using the same frequency, thereby minimizing interference and maximizing bandwidth efficiency. For example, the resource allocation apparatus may configure an objective function to achieve maximum bandwidth efficiency and minimize interference to other cells or beams while satisfying a bit rate or transmission rate required by a user, and find a solution of a resource allocation based using an optimization technique.

Meanwhile, when the optimization technique is applied to find a solution of the resource allocation for a system with frequency reusing technique, the resource allocation apparatus may obtain the solution of the resource allocation amount through a number of iterative operations such as an exhaustive search scheme. In this case, there may be a problem in that it is impossible to know in advance whether a solution exists before the iterative operations, and even how long it takes to find a solution in advance even if there is a solution. In order to solve such the problem, in an exemplary embodiment of the resource allocation apparatus, a resource allocation operation for finding the solution of the resource allocation based on a machine learning algorithm and/or a machine learning structure may be performed. For example, the resource allocation apparatus may perform a resource allocation operation based on the same or similar machine learning structure to the machine learning structure shown in FIG. 5.

Figure 5:
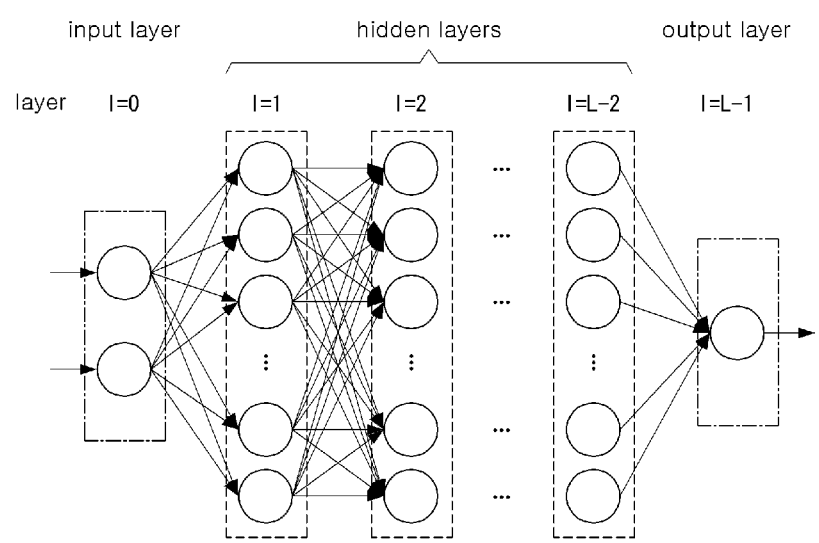
FIG. 5 is a conceptual diagram for describing an exemplary embodiment of a machine learning structure used for resource allocation in a communication system.

FIG. 5 is a conceptual diagram for describing an exemplary embodiment of a machine learning structure used for resource allocation in a communication system.

Referring to FIG. 5, a communication system may be the same as or similar to the communication system described with reference to FIG. 4. A resource allocation apparatus of the communication system may perform a resource allocation operation for frequency reuse in the communication system based on the same or similar machine learning structure to the machine learning structure shown in FIG. 5. Hereinafter, in describing an exemplary embodiment of the machine learning structure used for resource allocation in the communication system with reference to FIG. 5, content overlapping with those described with reference to FIGS. 1 to 4 may be omitted.

In an exemplary embodiment of the communication system, a computational model for performing a resource allocation operation through a machine learning structure may be constructed in the resource allocation apparatus. A memory and/or storage device of the resource allocation apparatus may include program instructions for performing machine learning according to a predetermined machine learning structure. Alternatively, the resource allocation apparatus may include a separate machine learning unit for performing machine learning according to a predetermined machine learning structure.

The resource allocation apparatus may obtain the computational model for efficiently allocating resources through machine learning according to a structure such as an artificial neural network (ANN) or a deep neural network (DNN). For example, it can be seen that FIG. 5 shows a DNN structure configured with multiple layers and multiple nodes among various machine learning structures. However, this is merely an example for convenience of description, and exemplary embodiments of the communication system are not limited thereto. For example, in an exemplary embodiment of the communication system, various machine learning structures such as an ANN structure, a recurrent neural network (RNN) structure, a neuron structure consisting of a single node, a perceptron structure consisting of a single node, a knowledge-based system structure, a structure to which a reasoning technique such as a Baysian rule is applied, and a deep neural network structure may be applied to the machine learning unit. A machine learning structure selected according to a predetermined criterion among various machine learning structures may be applied to the machine learning unit. For example, a machine learning structure selected according to various conditions such as development and/or production costs, performance requirements, and processor capability of the communication system and/or individual devices may be applied to the machine learning unit.

In an exemplary embodiment of the communication system, a plurality of layers constituting an artificial neural network may include an input layer, a hidden layer(s), an output layer, and the like. The input layer may be a layer to which a data set or data group to be learned is input. The input layer may include at least one or more input nodes. Some or all of entries constituting the data set may be input to each of the at least one or more input nodes constituting the input layer. The data set input to at least one or more input nodes constituting the input layer may be data that has undergone data preprocessing in advance. The output layer may refer to a layer in which data or signals input to the artificial neural network are output through operations in the artificial neural network. The output layer may include at least one or more output nodes.

At least one or more hidden layers may be disposed between the input layer and the output layer. An artificial neural network having two or more hidden layers may be referred to as a deep neural network (DNN). That is, in a neural network structure including an input layer, a hidden layer(s), and an output layer, the DNN may mean a neural network structure in which a plurality of hidden layers are disposed between the input layer and the output layer. A machine learning scheme based on the DNN structure may be referred to as deep learning. The hidden layer may be connected to the input layer, the output layer, or other hidden layer(s) through weight vectors.

In an exemplary embodiment of the communication system, a machine learning apparatus including a machine learning structure may perform a learning operation of updating the weight vectors of the artificial neural network. The machine learning apparatus may include a multi-layer perceptron classifier. The learning operation of the artificial neural network may be performed by the multi-layer perceptron classifier included in the machine learning apparatus. The multi-layer perceptron classifier may train the artificial neural network through a preconfigured learning algorithm. The learning algorithm may include machine learning algorithms such as a supervised learning algorithm and a non-supervised learning algorithm.

In an exemplary embodiment of the communication system, the machine learning apparatus may perform a series of operations through feed-forward operations in the artificial neural network structure and obtain an output value. The machine learning apparatus may calculate error information based on the output value and a preset reference value. The machine learning apparatus may perform a learning operation of modifying the weight vectors between the layers of the artificial neural network by back-propagating the calculated error information. The machine learning apparatus may modify the weight vectors between the layers of the artificial neural network through a preconfigured optimization algorithm. For example, the optimization algorithm may include a gradient descent scheme, alternating gradient descent scheme, stochastic gradient descent scheme, or adam-optimizer algorithm. The machine learning apparatus may repeatedly perform the learning operation by the number of epochs corresponding to a preset number of learning. As the number of epochs increases, prediction performance or accuracy of a model obtained through the machine learning may be improved. On the other hand, as the number of epochs increases, the amount of computation in the machine learning process may increase, the computation load may increase, and the learning efficiency may decrease. The number of epochs may be set to a value that a person skilled in the art determines is appropriate to improve the performance of the machine learning apparatus.

In an exemplary embodiment of the communication system, the resource allocation apparatus may perform pre-training for the resource allocation operation based on the predetermined machine learning structure. When the machine learning structure corresponds to an ANN, the total number of layers of the neural network structure may be L, and L may be a natural number of 2 or more. When the neural network corresponds to a DNN, L may be a natural number of 4 or more. Each layer may be expressed as the l(0,1, . . . L−1)-th layer from the input layer to the output layer, and among them, the (l=1)-th to (l=(L−2))-th layers may be the hidden layers. For example, the DNN structure may include three hidden layers, and the three hidden layers may consist of 32, 64, and 32 hidden nodes, respectively. Alternatively, the machine learning structure may correspond to a perceptron structure that is a linear classification machine learning tool. However, this is merely an example for convenience of description, and exemplary embodiments of the communication system are not limited thereto and may encompass various exemplary embodiments of machine learning or artificial neural network technologies.

In an exemplary embodiment of the communication system, one or more machine learning structures included in the resource allocation apparatus may receive input data I and generate output data O to generate a trained model. Here, the operation of generating the trained model may be performed at a specific point in time before the resource allocation apparatus actually performs the resource allocation operation in the communication environment.

In an exemplary embodiment of the communication system, the resource allocation apparatus may generate a first model through learning in a first machine learning structure, and may generate a second model through learning in a second machine learning structure. Here, the first model may be generated through learning based on the previously generated second model.

In the second machine learning structure included in the resource allocation apparatus, the input data I may include information related to a per-beam (or per-cell) required traffic amount. For example, the input data I may be vector data obtained by converting the information on the per-beam (or per-cell) required traffic amount into a vector. Based on the input data I input to the second machine learning structure in a vector form, the output data O may be output. Here, the input data I may be expressed as in Equation 1 below.

$$I=[(R_b)_1^1 (R_b)_1^2 \ldots (R_b)_1^M \ldots (R_b)_i^j \ldots (R_b)_F^M]^T \quad \text{[Table 1]}$$

In Equation 1, F may correspond to the frequency reuse factor. M may be the number of beams and/or cells. $(R_b)_i^j$ may indicate per-beam required traffic amount. In the second machine learning structure, an operation for finding values satisfying an objective function defined as in Equation 2 may be performed based on the input data I.

$$\operatorname*{argmin}_{w_i} P_{sum}, \sum_{i=1}^{F} w_i \leq W, w_i \geq 0, P_{sum} \leq P_{max} \quad \text{[Equation 2]}$$

$$P_{sum} = \sum_i^F \sum_j^M (P_t)_i^j, (P_t)_i^j = f((R_b)_i^j)$$

In Equation 2, $w_i$ may correspond to each bandwidth, and W may correspond to the total bandwidth available in a first communication node or communication system. $P_{sum}$ may correspond to a sum of power values $P_t$ for the respective bandwidths, and $P_{max}$ may correspond to a sum of powers available in the first communication node or communication system. $P_t$ may be defined as a value of a predetermined function having $R_b$ corresponding to the required traffic amount as a variable. In Equation 2, $$\operatorname*{argmin}_{w_i} P_{sum}$$

may be regarded as an equation of obtaining the bandwidth $w_i$ that minimizes the value of $P_{sum}$.

The output data O may correspond to a resource allocation result to be obtained through the resource allocation operation. For example, the output data O may correspond to a bandwidth allocation result for each beam (or for each cell). That is, the second machine learning structure may receive information related to the per-beam required traffic amount and output values corresponding to the bandwidth allocation amount. The output data O may be expressed as in Equation 3 below.

$$O=[w_1 \, w_2 \ldots w_F]^T \quad \text{[Equation 3]}$$

The output values included in the output data O of the second machine learning structure may be calculated as in Equation 4 by using a weight matrix $W_{lin}$ trained according to a regression learning or a linear regression (LR) learning scheme.

$$O=W_{lin}t \quad \text{[Equation 4]}$$

In Equation 4, t may correspond to a vector obtained by adding a bias term to the input data I of Equation 1. For example, it may be expressed as t=[1 I]. The weight matrix $W_{lin}$ may be calculated as in Equation 5 using an input learning data matrix X and an output learning data matrix Y.

$$W_{lin} = (X^T X)^{-1} X^T Y \qquad \text{[Equation 5]}$$

Each row of the matrix X may be configured with t for learning, and each row of Y may become an output O corresponding to t. When the number of learning data is N in total and the output of Equation 3 is derived using the input data vector of Equation 4, the size of the matrix X is N×(1+MF) and the size of the matrix Y is N×F.

As a result of the pre-training in the second machine learning structure, the second model may be generated. For example, as a result of the pre-training based on the data obtained from an iterative scheme such as an exhaustive search scheme in the second machine learning structure, the second model for bandwidth calculation based on the required traffic amount information may be generated. In other words, the second model generated through the pre-training may output the output data O including bandwidth allocation information as shown in Equation 3 when the input data I including required traffic amount information is input as shown in Equation 1.

Meanwhile, in the first machine learning structure included in the resource allocation apparatus, the input data I may include information related to the per-beam (or per-cell) required traffic amount. Here, the input data I may be vector data obtained by converting the information on the per-beam (or per-cell) required traffic amount into a vector. In the first machine learning structure, the input data I may be expressed in the same or similar manner to Equation 1.

The first machine learning structure may correspond to a perceptron structure. The first machine learning structure may output a value of +1 or −1 as an output value. Based on the second model generated through the pre-training in the second machine learning structure, the first machine learning structure may perform pre-training for determining whether the required traffic amount included in the input data I can be normally serviced through resources such as a system bandwidth or power available in the first communication node. For example, the first machine learning structure may be trained so as to output +1 when the required traffic amount included in the input data I can be serviced while satisfying a first condition as in Equation 6 below, and output −1 when the required traffic amount included in the input data I cannot be serviced while satisfying the first condition as in Equation 6 below.

$$\sum_{i=1}^{F} w_i \leq W, \ w_i \geq 0, \ P_{sum} \leq P_{max}, \ \gamma_i^j \geq 0, \ \forall \ i, j \qquad \text{[Equation 6]}$$

In Equation 6, $w_i$ may correspond to each bandwidth, and W may correspond to a total bandwidth available in the first communication node or communication system. $P_{sum}$ may correspond to a sum of power values for the respective bandwidths corresponding to the input data I, and $P_{max}$ may correspond to a sum of power available in the first communication node or communication system. $\gamma_i^j$ may be a value corresponding to a signal-to-noise ratio (SNR) condition for each beam, and may be calculated as in Equation 7 below.

$$\Delta_i [\gamma_i^1 \gamma_i^2 \ldots \gamma_i^M]^T = [1\ 1\ \ldots\ 1]^T, \qquad \text{[Equation 7]}$$

where $\Delta_i = \begin{bmatrix} 1/\rho_i^1 & -g_i^{2,1}\eta_i^1 & \cdots & -g_i^{M,1}\eta_i^M \\ -g_i^{1,2}\eta_i^1 & 1/\rho_i^1 & \cdots & -g_i^{M,2}\eta_i^M \\ \vdots & \vdots & \ddots & \vdots \\ -g_i^{1,M}\eta_i^1 & -g_i^{2,M}\eta_i^2 & \cdots & 1/\rho_i^M \end{bmatrix}$ In Equation 7, $g_i^{k,j}$ may mean a relative gain ratio of a path from the k-th beam or cell to the j-th beam or cell using $f_i$. $\eta_i^j$ may mean a spectral efficiency calculated as $(R_b)_i^j / w_i$. $\rho_i^j$ may mean a ratio of signal-to-noise plus interference that allows the spectral efficiency to be $\eta_i^j$ while satisfying the error performance required in the system. Here, $\rho_i^j$ may be obtained based on the Shannon's capacity limit theorem, or may be obtained in advance through simulation. When $\gamma_i^j$ calculated based on Equation 7 or the like is equal to or greater than 0, it may be determined that the SNR condition for the corresponding beam is satisfied.

As a result of the pre-training in the first machine learning structure, the first model may be generated. For example, as a result of the pre-training based on the iterative scheme such as an exhaustive search scheme in the first machine learning structure, the first model for determining whether the first condition is satisfied based on the required traffic amount information may be generated. In other words, when the input data I including the required traffic amount information as shown in Equation 1 is input, the first model generated through the pre-training may output +1 when the required traffic amount can be serviced while satisfying the first condition, and may output −1 when the required traffic amount cannot be serviced while satisfying the first condition. However, this is merely an example for convenience of description, and the determination method and output value of the first model may be determined in various ways.

The resource allocation apparatus of the first communication node may perform resource allocation operations based on the required traffic amount information in the communication environment by using the first and second models generated through the first and second machine learning structures. The resource allocation apparatus and the resource allocation method will be described in more detail below with reference to FIGS. 6 and 7.

Figure 6:
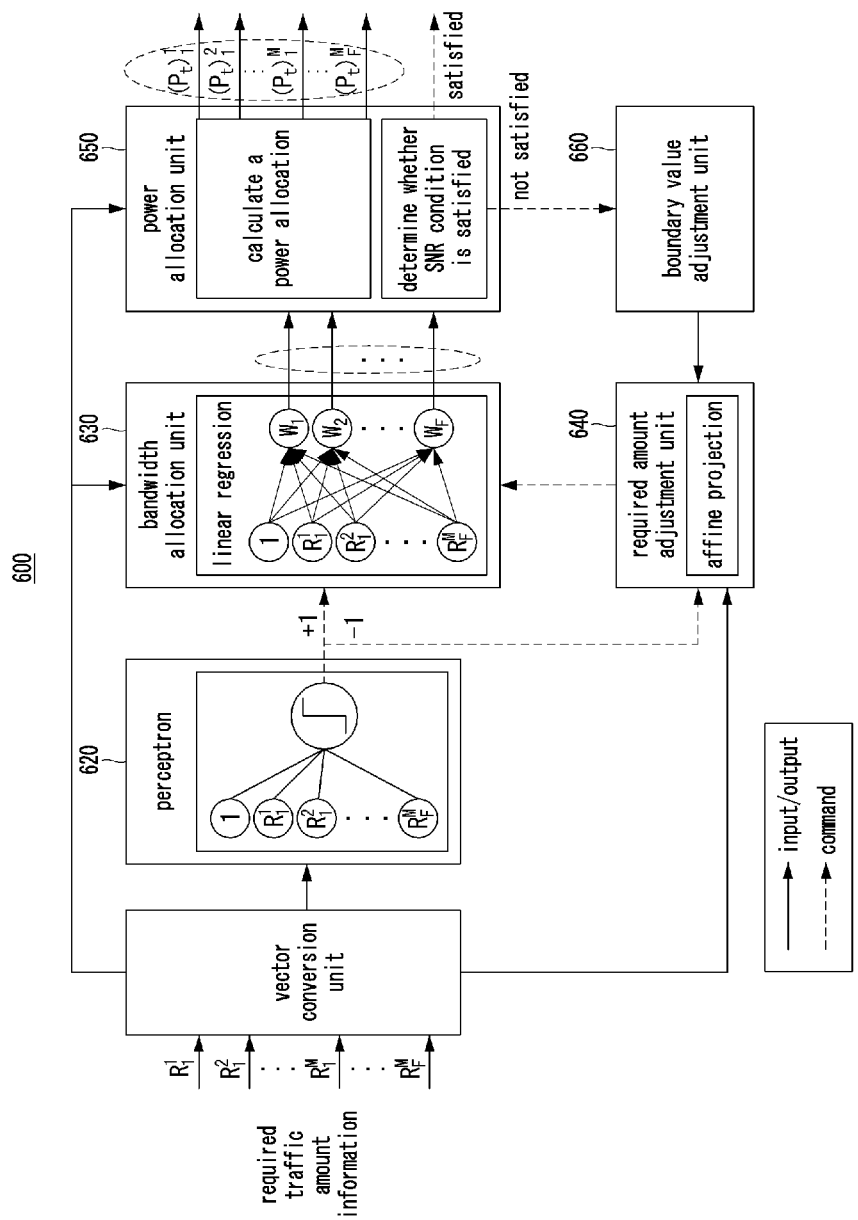
FIG. 6 is a conceptual diagram for describing an exemplary embodiment of a resource allocation apparatus in a communication system.

FIG. 6 is a conceptual diagram for describing an exemplary embodiment of a resource allocation apparatus in a communication system.

Referring to FIG. 6, in an exemplary embodiment of the communication system, a resource allocation apparatus 600 may perform an operation of allocating resources such as bandwidth and/or power based on required traffic information or required traffic amount information. The resource allocation apparatus 600 may include the same or similar components as those shown in FIG. 6 for the resource allocation operation. The resource allocation apparatus 600 may include a vector conversion unit 610, a possibility determination unit 620, a bandwidth allocation unit 630, a required amount adjustment unit 640, a power allocation unit 650, a boundary value adjustment unit 660, and the like.

In an exemplary embodiment of the communication system, the resource allocation apparatus 600 may obtain required traffic amount information $(R_1^1, R_1^2, \ldots, R_1^M, \ldots, R_i^j, \ldots, R_F^M)$. The vector conversion unit 610 may convert the required traffic amount information input to the resource allocation apparatus 600 to generate input data t in form of a vector. The input data t of the vector conversion unit 610 may be the same as or similar to the input data I of Equation 1. The input data t may be the same as or similar to Equation 8 below.

$$t=[1 I]=[1, R_1^1, R_1^2, \ldots, R_1^M, \ldots, R_i^j, \ldots, R_F^M]^T \quad \text{[Equation 8]}$$

The input data t in form of a vector generated by the vector conversion unit 610 may be input to the possibility determination unit 620. The possibility determination unit 620 may determine whether services can be provided based on the input data t by using the pre-trained first model. The possibility determination unit 620 may perform calculation related to whether services can be provided based on the input data t by the first model generated through the pre-training in the first machine learning structure having the perceptron structure described with reference to FIG. 5. The possibility determination unit 620 may output +1 when the required traffic amount included in the input data t can be serviced while satisfying the first condition, and output −1 when the required traffic amount included in the input data t cannot be serviced while satisfying the first condition. The calculation result in the first model may be expressed as Equation 9 below.

$$y=\text{sgn}(f(t))=\text{sgn}(c^T t) \quad \text{[Equation 9]}$$

In Equation 9, the sgn function may correspond to a sign function or a signum function, c may correspond to a coefficient vector corresponding to the pre-trained first model and correspond to a coefficient vector setting a boundary value for determining a sign for f(t). Through the calculation shown in Equation 9, the first model may output a value of +1 or a value of −1.

When a value of +1 is output from the possibility determination unit 620, the value of +1 may be input to the bandwidth allocation unit 630 as a command. The bandwidth allocation unit 630 may allocate a bandwidth according to the input data t transferred from the vector conversion unit 610 according to the pre-trained first model. The bandwidth allocation unit 630 may perform an operation for bandwidth allocation according to the input data t by the second model generated through pre-training in the second machine learning structure to which the linear regression scheme described with reference to FIG. 5 is applied. When the input data t including the required traffic amount information (e.g., $t=[1, R_1^1, R_1^2, \ldots, R_1^M, \ldots, R_i^j, \ldots, R_F^M]^T$) is input, the second model of the bandwidth allocation unit 630 may output the output data O including bandwidth allocation information. Here, the output data O may be the same as or similar to Equation 3 ($O=[w_1 w_2 \ldots w_F]^T$). When the coefficient matrix corresponding to the pre-trained second model is $W_{lin}$, the output data O may be expressed as in Equation 10 below.

$$O=[w_1 w_2 \ldots w_F]^T = W_{lin} t \quad \text{[Equation 10]}$$

On the other hand, when a value of −1 is output from the possibility determination unit 620, the value of −1 may be input to the required amount adjustment unit 640 as a command. That the value of −1 is input to the required amount adjustment unit 640 may mean that it is determined that the required traffic amount included in the input data I cannot be serviced while satisfying the first condition. In this case, the required amount adjustment unit 640 may generate adjusted input data I' by adjusting the input data I. The adjusted input data I' may be configured to have reduced values from the previous required traffic amount included in the input data I.

The operation of generating the adjusted input data I' in the required amount adjustment unit 640 may be performed through an affine projection. The required amount adjustment unit 640 may generate the adjusted input data I' by performing affine projection of the input data I to a boundary space of the perceptron. To express this mathematically, the required amount adjustment unit 640 may perform affine projection of the input data I to a null space of f(t) in the process of calculating the second model having the perceptron structure. Here, the null space of f(t) may mean a solution space of f(t)=0. The solution space of f(t)=0 may be defined by a vector equation as in Equation 11.

$$U=V+a=s_1 v_1+s_2 v_2+ \ldots +s_{FM-1} v_{FM-1}+a \quad \text{[Equation 11]}$$

In Equation 11, V may correspond to a space defined as $V=\text{span}\{v_1, v_2, \ldots, v_{FM-1}\}$, and $s_j$ (j=1, 2, ..., FM−1) may be an arbitrary real number, and a may correspond to a vector for transitioning the space V to a space U. The operation of generating the adjusted input data I' by performing affine projection of the input data I to the solution space of f(t)=0, performed by the required amount adjustment unit 640, may be expressed as Equation 12 below.

$$I'=\text{Proj}_u(I)=\text{Proj}_v(I-a)+a=A(A^T A)^{-1} A^T (I-a)+a \quad \text{[Equation 12]}$$

In Equation 12, matrix A may be defined as $A=[v_1 v_2 \ldots v_{FM-1}]$, having $v_j$ in Equation 11 as column vectors. Such the affine projection may be regarded as an operation for adding a minimum reduced amount within a resource limit range that can be provided by the system when the required traffic amount cannot be serviced while satisfying an interference condition and a resource limit that can be provided by the system.

The required amount adjustment unit 640 may output the adjusted input data t'=[1 I'] including the reduced required traffic amount information. The adjusted input data t' may be input to the bandwidth allocation unit 630. The bandwidth allocation unit 630 may allocate a bandwidth according to the input data t' adjusted by the pre-trained second model. The bandwidth allocation unit 630 may output the output data O corresponding to the adjusted input data t' by performing the operation shown in Equation 13.

$$O=[w_1 w_2 \ldots w_F]^T = W_{lin} t' \quad \text{[Equation 13]}$$

The bandwidth allocation unit 630 may output the output data O obtained based on the input data t as shown in Equation 10, or the output data O obtained based on the input data t' as shown in Equation 13. The output data O may be input to the power allocation unit 650. The power allocation unit 650 may perform an operation for allocating a power based on the output data O including the bandwidth allocation information. The power allocation unit 650 may calculate per-beam (or per-cell) power allocation information $(P_t)_1^1, (P_t)_1^2, \ldots, (P_t)_1^M, \ldots, (P_t)_i^j, \ldots, (P_t)_F^M$ based on the per-beam (or per-cell) bandwidth allocation information included in the output data O.

The power allocation unit 650 may calculate $\gamma_i^j$ values corresponding to the SNR according to the bandwidth allocation information generated by the bandwidth allocation unit 630 and/or the power allocation information generated by the power allocation unit 650. The power allocation unit 650 may identify whether the calculated values of $\gamma_i^j$ satisfy the SNR condition ($\gamma_i^j \geq 0$, $\forall i, j$) according to the first condition. Here, $\gamma_i^j$ values may be calculated based on the same or similar method to Equation 7.

When the SNR condition according to the first condition is satisfied, the resource allocation apparatus 600 may determine that the bandwidth allocation information ($w_1, w_2, \ldots, w_F$) generated by the bandwidth allocation unit 630 and the power allocation information (($P^T)_1^1, (P_t)_1^2, \ldots, (P_t)_1^M, \ldots, (P_t)_F^M$) generated by the power allocation unit 650 are obtained as a resource allocation result. The resource allocation apparatus 600 may output the bandwidth allocation information and the power allocation information.

On the other hand, when the SNR condition according to the first condition is not satisfied, a command indicating that the SNR condition is not satisfied may be transmitted to the boundary value adjustment unit 660. The boundary value adjustment unit 660 may perform an operation for adjusting a boundary value used for the affine projection by the required amount adjustment unit 640. Specifically, the required amount adjustment unit 640 may generate an adjusted vector a' by adjusting the vector a used in the affine projection as in Equation 12. By the adjusted vector a', U in Equation 11 may be adjusted to U' in Equation 14.

$$U'=V+a'=s_1v_1+s_2v_2+\ldots+s_{FM-1}V_{FM-1}+a' \quad \text{[Equation 14]}$$

U' in Equation 14 may be regarded as having a boundary space shifted in a negative direction from a perceptron boundary space of U in Equation 11. That is, the adjusted vector a' may be adjusted to a value such that the boundary line of U' is moved in a negative direction from the boundary space of U'. The vector a' adjusted in this manner may be transmitted to the required amount adjustment unit 640. The required amount adjustment unit 640 may perform the affine projection based on the adjusted vector a' and the adjusted space U' by performing an operation as in Equation 15 that is a modified from of Equation 12.

$$I'=\text{Proj}_{u'}(I)=\text{Proj}_v(I-a')+a'=A(A^TA)^{-1}A^T(I-a')+a' \quad \text{[Equation 15]}$$

The required amount adjustment unit 640 may output the adjusted input data I' obtained based on Equation 15. The adjusted input data I' may be input to the bandwidth allocation unit 630. When the adjusted input data t'=[1 I'] generated based on the boundary value adjusted by the boundary value adjustment unit 660 is input to the bandwidth allocation unit 630, the bandwidth allocation operation in the bandwidth allocation unit 630 and the power allocation operation in the power allocation unit 650 may be performed again. When it is determined that the SNR condition according to the first condition is satisfied according to the re-performed bandwidth allocation operation and power allocation operation, the resource allocation apparatus 600 may output bandwidth allocation information and power allocation information.

Figure 7:
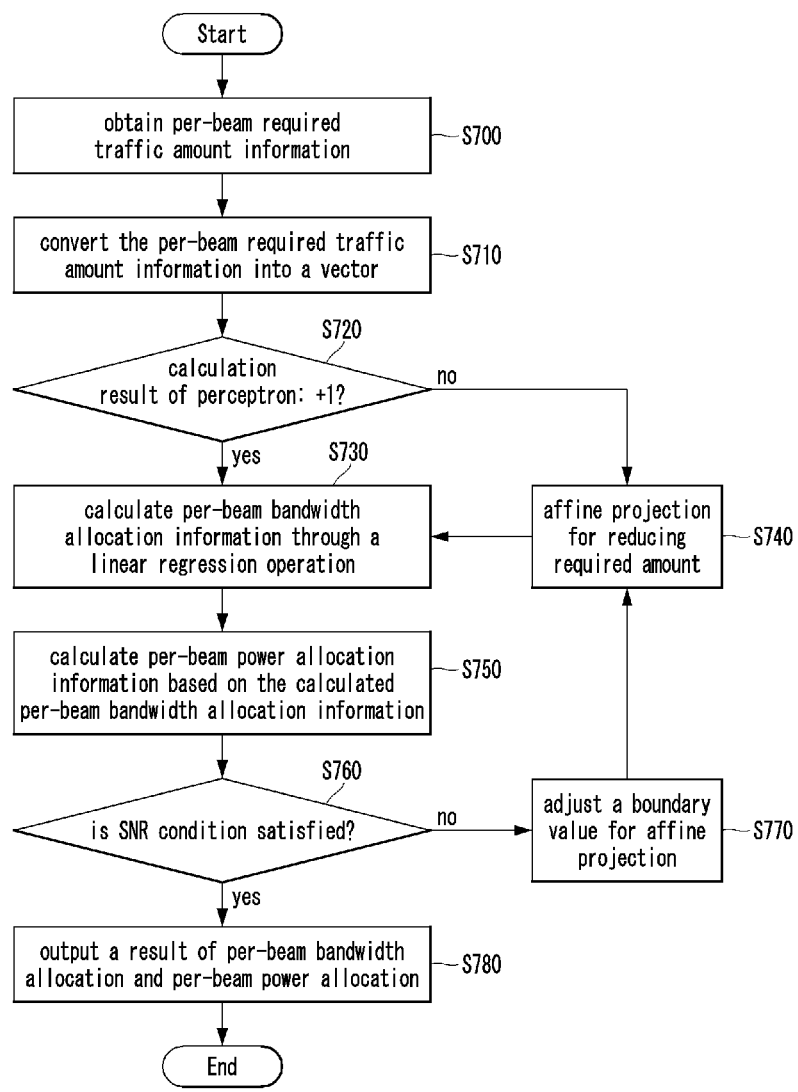
FIG. 7 is a conceptual diagram for describing an exemplary embodiment of a resource allocation method in a communication system.

FIG. 7 is a conceptual diagram for describing an exemplary embodiment of a resource allocation method in a communication system.

Referring to FIG. 7, in an exemplary embodiment of a communication system, a first communication node or a resource allocation apparatus included in the first communication node may perform an operation of allocating resources such as bandwidth and/or power based on required traffic information or required traffic amount information. Here, the resource allocation apparatus may be the same as or similar to the resource allocation apparatus 600 described with reference to FIG. 6. Alternatively, the first communication node performing resource allocation in the communication system may be referred to as a resource allocation apparatus. Hereinafter, in describing an exemplary embodiment of the resource allocation method in the communication system with reference to FIG. 7, content overlapping with that described with reference to FIGS. 1 to 6 may be omitted.

In an exemplary embodiment of the communication system, the resource allocation apparatus may obtain per-beam required traffic amount information (S700). Here, the required traffic amount information may be the same as or similar to the required traffic amount information described with reference to FIG. 6. The resource allocation apparatus may convert the obtained required traffic amount information into a vector to generate input data t=[1 I] in form of a vector (S710). The operation of the resource allocation apparatus according to the step S710 may be the same as or similar to that of the vector conversion unit 610 described with reference to FIG. 6.

The resource allocation apparatus may input the input data t obtained in the step S710 to the first model generated through pre-training based on the perceptron structure, and identify a calculation result in the first model (S720). The operation of the resource allocation apparatus according to the step S720 may be the same as or similar to the operation of the possibility determination unit 620 described with reference to FIG. 6.

When the result of the calculation based on the first model is +1, the resource allocation apparatus may input the input data t to the second model generated through pre-training based on the linear regression scheme, and may calculate bandwidth allocation information through the calculation based on the second model (S730). The operation of the resource allocation unit according to the step S730 may be the same as or similar to that of the bandwidth allocation unit 630 described with reference to FIG. 6.

On the other hand, when the result of the calculation based on the first model is −1, the resource allocation apparatus may generate the adjusted input data t' by adjusting the input data t through the affine projection (S740). The adjusted input data t' may be configured to have reduced values from the previous required traffic amount included in the input data t. The operation of the resource allocation apparatus according to the step S740 may be the same as or similar to the operation of the required amount adjustment unit 640 described with reference to FIG. 6. The resource allocation apparatus may input the adjusted input data t' to the second model, and may calculate bandwidth allocation information through calculation based on the second model (S730).

The resource allocation apparatus may output the output data O through the operation according to the step S730. The output data O may include per-beam bandwidth allocation information. The resource allocation apparatus may calculate per-beam power allocation information based on the per-beam bandwidth allocation information (S750). The resource allocation apparatus may identify whether the bandwidth allocation information obtained through the step S730 and/or power allocation information obtained through the step S750 satisfies the SNR condition (S760). The operations of the resource allocation apparatus according to the steps S750 and S760 may be the same as or similar to those of the bandwidth allocation unit and the power allocation unit 650 described with reference to FIG. 6.

When it is determined that the SNR condition is satisfied, the resource allocation apparatus may regard the obtained per-beam bandwidth allocation information and/or per-beam power allocation information as a resource allocation result. The resource allocation apparatus 600 may complete the resource allocation operation for each beam by outputting the bandwidth allocation information and the power allocation information (S780).

On the other hand, when it is determined that the SNR condition is not satisfied, the resource allocation apparatus may perform an operation for adjusting the boundary value used for the affine projection in the step S740 (S770). The operation of the resource allocation apparatus according to the step S770 may be the same as or similar to the operation of the boundary value adjustment unit 660 described with reference to FIG. 6. The resource allocation apparatus may perform the operation of the step S740 again through the affine projection based on the boundary value adjusted in the step S770. The resource allocation apparatus may perform the operations according to the steps S730 and S750 to S780 based on the adjusted input data obtained through the steps S770 and S740.

According to exemplary embodiments of a method and an apparatus for resource allocation in a wireless communication system, in the wireless communication system to which the frequency reuse technique is applied, a first communication node may allocate resources such as bandwidth and power based on machine learning. The first communication node may obtain information on per-beam (or per-cell) required traffic amount, and determine whether the required traffic amount can be serviced through resources such as a system bandwidth and a power available in the first communication node. When it is determined that the required traffic amount cannot be serviced, the traffic amount may be reduced, and a per-beam bandwidth and/or power for servicing the reduced traffic amount may be determined. Through such the process, an unnecessary amount of computation in the resource allocation process can be reduced, and service efficiency can be improved.

However, the effects that can be achieved by the resource allocation method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first apparatus in a communication system, the operation method comprising:
   obtaining information on a per-beam required traffic amount;
   determining whether the per-beam required traffic amount can be serviced while satisfying a first condition including an available total bandwidth condition and an available total power condition according to a first model generated through pre-training in a first machine learning structure;
   in response to determining that the per-beam required traffic amount can be serviced while satisfying the first condition, calculating per-beam bandwidth allocation information based on the per-beam required traffic amount;
   calculating per-beam power allocation information based on the per-beam bandwidth allocation information;
   identifying whether a signal-to-noise ratio (SNR) condition included in the first condition is satisfied based on the per-beam power allocation information; and
   in response to identifying that the SNR condition is satisfied, outputting the per-beam bandwidth allocation information and the per-beam power allocation information.

2. The operation method according to claim 1, wherein the determining comprises:
   generating first input data by converting the information on the per-beam required traffic amount into a vector;
   inputting the first input data to the first model; and
   identifying an output value of the first model.

3. The operation method according to claim 2, wherein the first machine learning structure has a perceptron structure, the output value of the first model, which has a positive value, means that the per-beam required traffic amount can be serviced while satisfying the first condition, and the output value of the first model, which has a negative value, means that the per-beam required traffic amount cannot be serviced while satisfying the first condition.

4. The operation method according to claim 2, wherein the pre-training in the first machine learning structure is performed based on a second model after the second model is generated through pre-training in a second machine learning structure for calculation of the per-beam bandwidth allocation information.

5. The operation method according to claim 1, wherein the calculating of the per-beam bandwidth allocation information comprises:
   inputting first input data generated based on the information on the per-beam required traffic amount into a second model generated through pre-training in a second machine learning structure; and
   obtaining output data output from the second model,
   wherein the output data includes the per-beam bandwidth allocation information.

6. The operation method according to claim 5, wherein the second machine learning structure has a machine learning structure according to a linear regression learning scheme, and the pre-training in the second machine learning structure is performed based on an exhaustive search scheme in a direction in which a value of a loss function calculated based on first bandwidth allocation information output based on information on a first required traffic amount is minimized.

7. The operation method according to claim 1, further comprising, after the determining,
   in response to determining that the per-beam required traffic amount cannot be serviced while satisfying the first condition, performing an affine projection operation for calculating a reduced required traffic amount reduced from the per-beam required traffic amount; and
   calculating the per-beam bandwidth allocation information based on second input data generated as a result of the affine projection operation and including information on the reduced required traffic amount.

8. The operation method according to claim 7, further comprising, after the identifying,
- in response to identifying that the SNR condition is not satisfied, adjusting a boundary value used in the affine projection operation;
- performing the affine projection operation based on the adjusted boundary value; and
- calculating the per-beam bandwidth allocation information based on third input data generated as a result of the affine projection operation performed based on the adjusted boundary value.

9. A first apparatus in a communication system, comprising:
- a processor;
- wherein the processor causes the first apparatus to:
- obtain information on a per-beam required traffic amount;
- determine whether the per-beam required traffic amount can be serviced while satisfying a first condition including an available total bandwidth condition and an available total power condition according to a first model generated through pre-training in a first machine learning structure;
- in response to determining that the per-beam required traffic amount can be serviced while satisfying the first condition, calculate per-beam bandwidth allocation information based on the per-beam required traffic amount;
- calculate per-beam power allocation information based on the per-beam bandwidth allocation information;
- identify whether a signal-to-noise ratio (SNR) condition included in the first condition is satisfied based on the per-beam power allocation information; and
- in response to identifying that the SNR condition is satisfied, output the per-beam bandwidth allocation information and the per-beam power allocation information.

10. The first device according to claim 9, wherein in the determining, the processor further causes the first apparatus to:
- generate first input data by converting the information on the per-beam required traffic amount into a vector;
- input the first input data to the first model; and
- identify an output value of the first model.

11. The first device according to claim 10, wherein the first machine learning structure has a perceptron structure, the output value of the first model, which has a positive value, means that the per-beam required traffic amount can be serviced while satisfying the first condition, the output value of the first model, which has a negative value, means that the per-beam required traffic amount cannot be serviced while satisfying the first condition, and the pre-training in the first machine learning structure is performed based on a second model after the second model is generated through pre-training in a second machine learning structure for calculation of the per-beam bandwidth allocation information.

12. The first device according to claim 9, wherein in the calculating of the per-beam bandwidth allocation information, the processor further causes the first apparatus to:
- input first input data generated based on the information on the per-beam required traffic amount into a second model generated through pre-training in a second machine learning structure; and
- obtain output data output from the second model, wherein the output data includes the per-beam bandwidth allocation information.

13. The first device according to claim 12, wherein the second machine learning structure has a machine learning structure according to a linear regression learning scheme, and the pre-training in the second machine learning structure is performed based on an exhaustive search scheme in a direction in which a value of a loss function calculated based on first bandwidth allocation information output based on information on a first required traffic amount is minimized.

14. The first device according to claim 9, wherein the processor further causes the first apparatus to, after the determining,
- in response to determining that the per-beam required traffic amount cannot be serviced while satisfying the first condition, perform an affine projection operation for calculating a reduced required traffic amount reduced from the per-beam required traffic amount; and
- calculate the per-beam bandwidth allocation information based on second input data generated as a result of the affine projection operation.

15. The first device according to claim 14, wherein the processor further causes the first apparatus to, after the identifying,
- in response to identifying that the SNR condition is not satisfied, adjust a boundary value used in the affine projection operation;
- perform the affine projection operation based on the adjusted boundary value; and
- calculate the per-beam bandwidth allocation information based on third input data generated as a result of the affine projection operation performed based on the adjusted boundary value.

* * * * *